(12) United States Patent
Ito

(10) Patent No.: US 11,669,074 B2
(45) Date of Patent: Jun. 6, 2023

(54) NUMERICAL CONTROL DEVICE

(71) Applicant: FANUC CORPORATION, Yamanashi (JP)

(72) Inventor: Motohiko Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 274 days.

(21) Appl. No.: 17/034,680

(22) Filed: Sep. 28, 2020

(65) Prior Publication Data

US 2021/0109501 A1 Apr. 15, 2021

(30) Foreign Application Priority Data

Oct. 9, 2019 (JP) .............................. JP2019-186207

(51) Int. Cl.
*G05B 19/416* (2006.01)

(52) U.S. Cl.
CPC .. *G05B 19/416* (2013.01); *G05B 2219/35524* (2013.01)

(58) Field of Classification Search
CPC ........ G05B 19/416; G05B 2219/35524; G05B 2219/43141; Y02P 90/02
See application file for complete search history.

(56) References Cited

U.S. PATENT DOCUMENTS

| 2002/0138171 A1* | 9/2002 | Fukutani | ................ | B23Q 15/12 700/188 |
| 2015/0134103 A1* | 5/2015 | Tsuda | ................. | G05B 19/4103 700/192 |

FOREIGN PATENT DOCUMENTS

| CN | 105488282 A | * | 4/2016 | |
| EP | 1973020 A2 | * | 9/2008 | .......... G05B 19/408 |
| JP | 2008290135 A | * | 12/2008 | |
| JP | 2011-118952 | | 6/2011 | |

* cited by examiner

*Primary Examiner* — Thomas C Lee
*Assistant Examiner* — Michael Tang
(74) *Attorney, Agent, or Firm* — Wenderoth, Lind & Ponack, L.L.P.

(57) ABSTRACT

To enable turning-on/off of constant surface speed control during machining. A numerical control device has a constant surface speed control function for controlling a spindle rotation rate to make a surface speed constant, and includes: a surface speed calculating unit for calculating a surface speed based on a spindle rotation speed having been designated and a distance from a rotation center; a cutting speed setting unit for setting a minimum cutting speed and a maximum cutting speed; a comparison unit for comparing the surface speed with the minimum cutting speed and the maximum cutting speed; and an operation control unit for controlling whether to activate the constant surface speed control function based on a result of the comparison made by the comparison unit.

3 Claims, 9 Drawing Sheets

FIG. 6

```
MACHINING PROGRAM)
O0001
:
M03(SPINDLE FORWARD ROTATION COMMAND)
:
T1(TOOL SELECTION)
G01 X_ Z_ F_ (CUTTING FEED COMMAND)
:
M05(SPINDLE STOP COMMAND)
:
M30
```

NUMERICAL CONTROL DEVICE

This application is based on and claims the benefit of priority from Japanese Patent Application No. 2019-186207, filed on 9 Oct. 2019, the content of which is incorporated herein by reference.

BACKGROUND OF THE INVENTION

Field of the Invention

The present invention relates to a numerical control device.

Related Art

In a typical turning cutting process by a lathe, control for making a surface speed constant is performed. More specifically, in a case where a machining target is machined in a state where the machining target is attached to a spindle of the lathe and the machining target continues to rotate at a constant speed, a surface speed of a portion of the machining target in contact with a tool decreases, as the tool advances toward a center portion of the machining target. Consequently, accuracy in cutting the machining target may be reduced and/or the life of the tool may be shortened, disadvantageously. Conversely, the surface speed of the portion of the machining target in contact with the tool increases, as the tool advances toward the outer periphery of the machining target. Consequently, the cutting edge of the tool may be broken and/or the life of the tool may be shortened. In order to deal with this, typically, constant surface speed control for making the surface speed constant is performed so as to make a relative speed between the tool and the contact portion of the machining target constant, whereby a reduction in accuracy in cutting the machining target is prevented and the life of the tool is extended.

Accordingly, every time the position of the tool on a reference axis changes, the spindle, to which the machining target is attached, accelerates/decelerates. If machining is performed with frequent changes of the position of the tool on the reference axis, electric power consumption may increase and/or a spindle motor may be overheat, disadvantageously.

In this regard, there has been known a technique related to constant surface speed control (see Japanese Unexamined Patent Application, Publication No. 2011-118952, for example) that analyzes a machining program before machining so as to perform a constant surface speed calculation, that efficiently controls rotation of the spindle such that the calculated surface speed is attained when the rotation of the spindle is required, and that does not perform acceleration/deceleration control on the spindle in a block that is not related to machining, e.g., a block for positioning. In this manner, this technique can prevent or reduce wasteful electric power consumption.

Patent Document 1: Japanese Unexamined Patent Application, Publication No. 2011-118952

SUMMARY OF THE INVENTION

However, in the field of constant surface speed control, there has been a demand for a technique capable of turning ON/OFF the constant surface speed control during machining.

An aspect of the present disclosure provides a numerical control device that has a constant surface speed control function for controlling a spindle rotation rate to make a surface speed constant and that includes: a surface speed calculating unit configured to calculate a surface speed based on a spindle rotation speed having been designated and a distance from a rotation center; a cutting speed setting unit configured to set a minimum cutting speed and a maximum cutting speed; a comparison unit configured to compare the surface speed with the minimum cutting speed and the maximum cutting speed; and an operation control unit configured to control whether to activate the constant surface speed control function based on a result of the comparison made by the comparison unit.

According to an aspect of the present disclosure, it is possible to turn ON/OFF the constant surface speed control during machining.

BRIEF DESCRIPTION OF THE DRAWINGS

FIG. 6 is a view showing an example of a machining program in the embodiment;

DETAILED DESCRIPTION OF THE INVENTION

1. First Embodiment

The following will describe a first embodiment of the present invention with reference to FIGS. 1 to 6.

1.1 Overview of Invention

A numerical control device according to a first embodiment automatically turns ON/OFF constant surface speed control so that a cutting speed (surface speed) falls within a range of recommended cutting speeds of a tool.

More specifically, firstly, the range of the recommended cutting speeds is preliminarily set by the numerical control device. The range of the recommended cutting speeds can be set for each tool. Then, during normal operation, the numerical control device turns OFF the constant surface speed control, and gives a program command to designate a spindle rotation speed. At this time, a default spindle rotation rate may be set as a parameter. In addition, among X positions of the tool obtained with the spindle rotation speed designated by the program command, the numerical control device determines a minimum value (Xmin) and a maximum value (Xmax) of X positions at which an actual cutting speed falls within the range of the recommended cutting speeds. Based on a result of comparison of an X position with Xmin and Xmax, the numerical control device turns ON/OFF the constant surface speed control.

Figure 1:
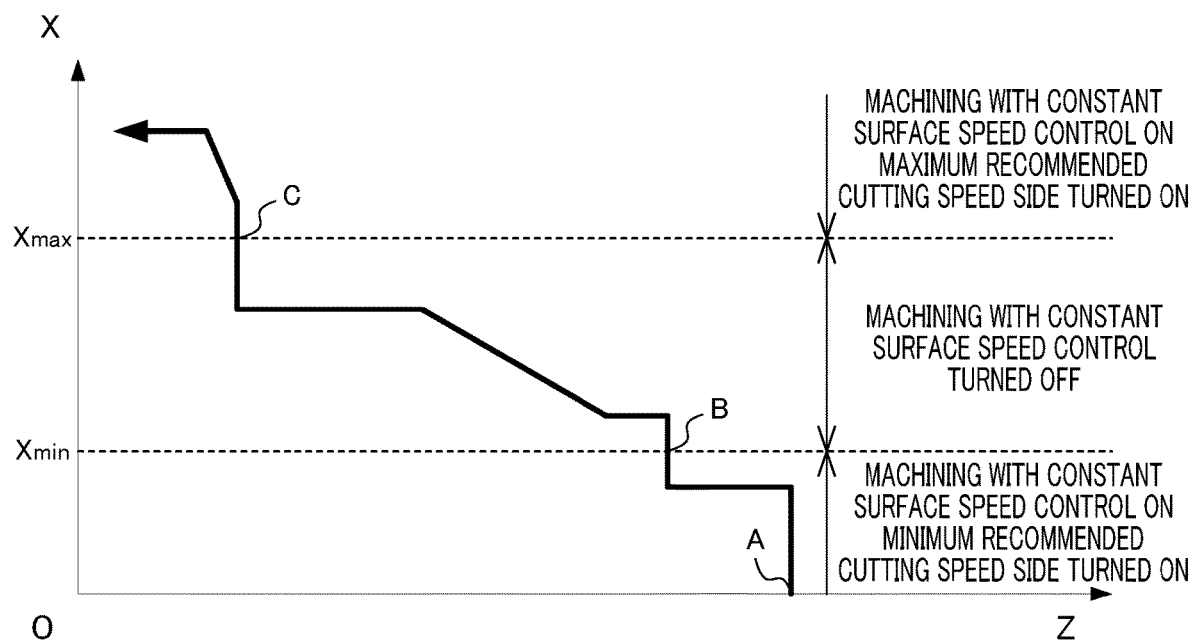
FIG. 1 is a view showing an example of a correspondence relation between a machining route and an ON/OFF state of constant surface speed control in an embodiment.

FIG. 1 is a view showing an example of a correspondence relation between a machining route and an ON/OFF state of the constant surface speed control. As shown in FIG. 1, in a case where the X position is within the range from Xmin to Xmax inclusive, the numerical control device turns OFF the constant surface speed control. If the X position is greater than Xmax, the numerical control device turns ON the constant surface speed control to maintain the surface speed at Xmax. If the X position is smaller than Xmin, the numerical control device turns ON the constant surface speed control to maintain the surface speed at Xmin.

In the example shown in FIG. 1, from point A, at which the machining route starts, to point B, at which the X position becomes Xmin, the constant surface speed control on the minimum recommended cutting speed side is set to ON. From point B to point C, at which the X position becomes Xmax, the constant surface speed control is set to OFF. In a portion of the route which extends beyond point C and which has an X position greater than Xmax, the constant surface speed control on the maximum recommended cutting speed side is set to ON.

Figure 2:
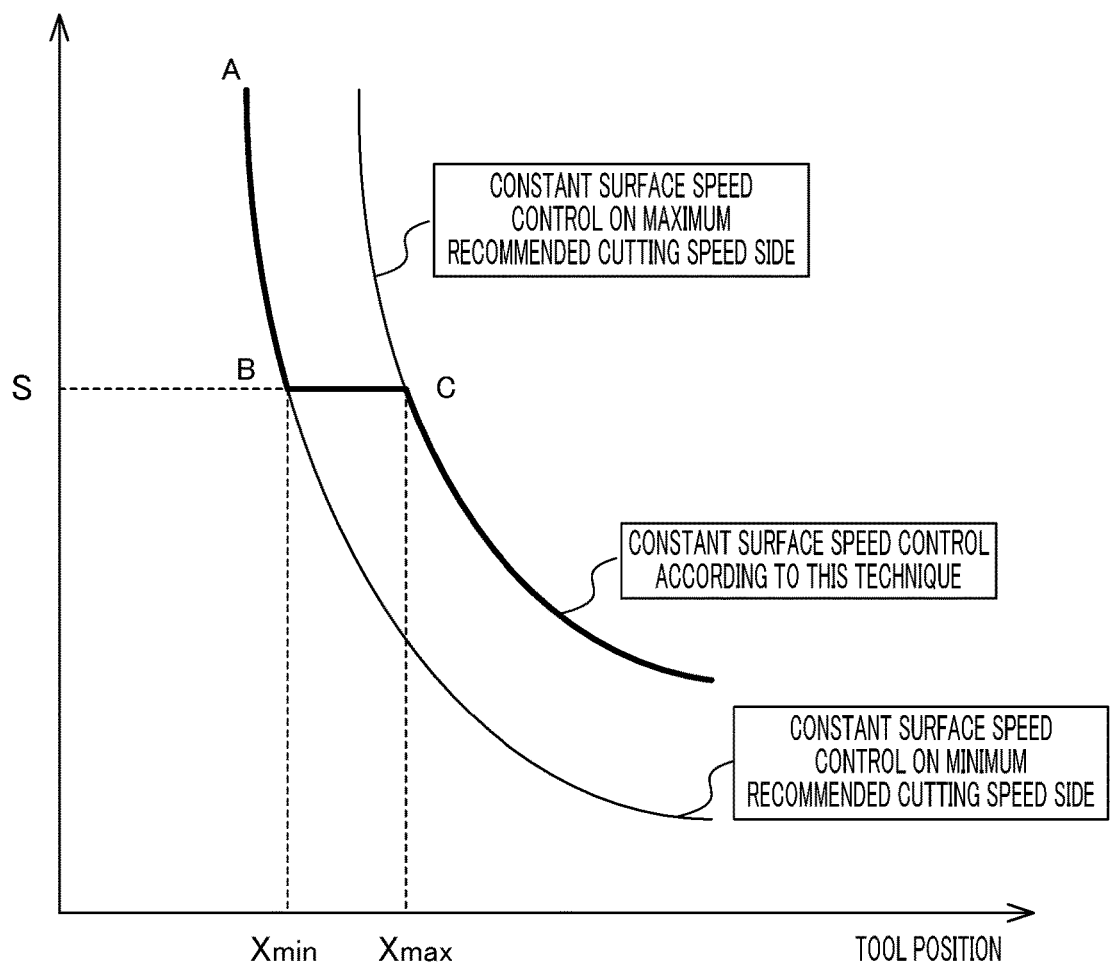
FIG. 2 shows a graph indicating how a spindle rotation speed changes when the constant surface speed control shown in FIG. 1 is executed.

FIG. 2 shows how the spindle rotation speed changes when the constant surface speed control shown in FIG. 1 is executed. From point A to point B, the spindle rotation speed changes as indicated by a portion of a curved line indicating a relation between a tool position and a spindle rotation speed, the portion corresponding to the constant surface speed control on the minimum recommended cutting speed side. At the time when the tool position reaches point B, that is, at the time when the X position becomes Xmin, the spindle rotation speed maintains a spindle rotation speed command value S. Thereafter, at the time when the tool position reaches point C, that is, at the time when the X position becomes Xmax, the spindle rotation speed changes as indicated by a portion of the curved line indicating the relation between the tool position and the spindle rotation speed, the portion corresponding to the constant surface speed control on the maximum recommended cutting speed side.

In a case where the X position of the tool moves in a rapid traverse mode, the machine tool does not perform machining. Therefore, in this case, the numerical control device turns OFF the constant surface speed control regardless of the X position of the tool.

1.2 Configuration of Invention

Figure 3:
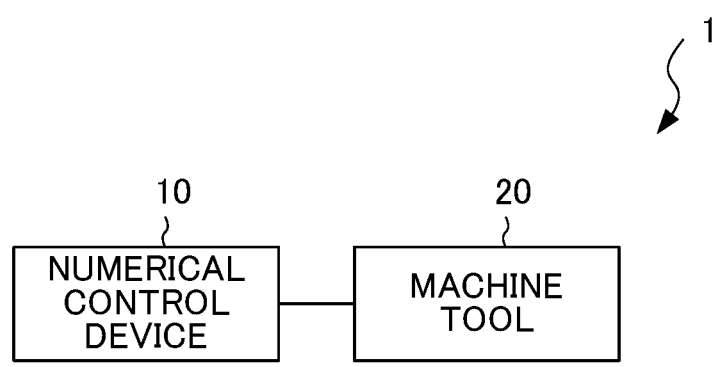
FIG. 3 is a view showing an overall configuration of a numerical control system according to the embodiment.

FIG. 3 is a view showing an overall configuration of a numerical control system 1 according to the first embodiment of the present invention. The numerical control system 1 includes a numerical control device 10 and a machine tool 20. The numerical control device 10 and the machine tool 20 are associated with each other in a one-to-one relation and are provided as a single set. In addition, the numerical control device 10 and the machine tool 20 are communicably connected to each other. Although not shown in FIG. 3, the numerical control device 10 and the machine tool 20 may be connected to each other over a network. The network is realized by a network such as LAN (Local Area Network) laid in a factory.

The numerical control device 10 is a device for controlling the machine tool 20 so that the machine tool 20 performs a predetermined machining work. A configuration and functions of the numerical control device 10 will be specifically described later.

The machine tool 20 is a device for performing a predetermined machining work, such as a cutting work, under control of the numerical control device 10. The machine tool 20 includes a motor that is to be driven to machine a workpiece, the spindle and a feed shaft attached to the motor, and a jig and a tool for each of these shafts. The machine tool 20 is configured to perform a predetermined machining work by driving the motor based on an operation command outputted from the numerical control device 10. Here, the predetermined machining work may include at least a cutting work. In addition to the cutting work, the machine tool may execute other works such as a grinding work, a polishing work, a rolling work, and/or a forging work, for example.

Figure 4:
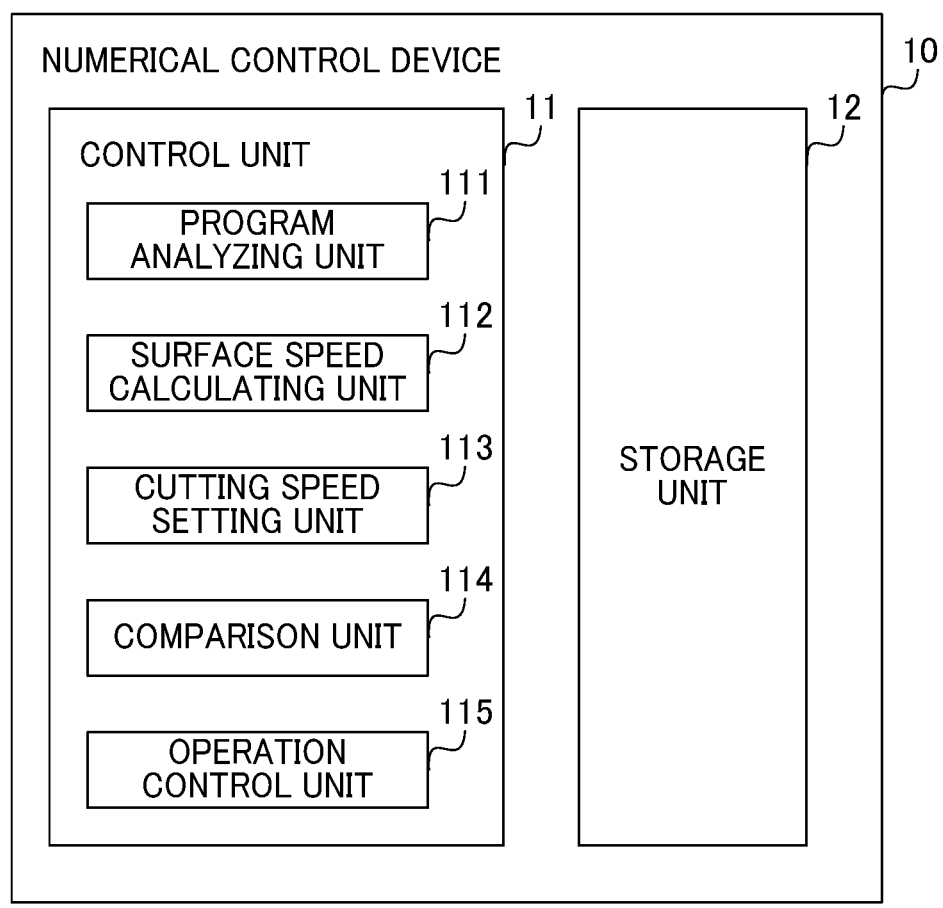
FIG. 4 is a functional block diagram of a numerical control device according to the embodiment.

FIG. 4 is a functional block diagram of the numerical control device 10. The numerical control device 10 includes a control unit 11 and a storage unit 12. The control unit 11 includes a program analyzing unit 111, a surface speed calculating unit 112, a cutting speed setting unit 113, a comparison unit 114, and an operation control unit 115.

The control unit 11 includes a CPU, a ROM, a RAM, and/or a CMOS memory. These elements are known to persons skilled in the art, and are configured to be communicable with each other via a bus.

The CPU is a processor for performing comprehensive control on the numerical control device 10. The CPU is configured to read a system program and an application program in the ROM via the bus and to perform comprehensive control on the numerical control device 10 according to the system program and application program, so that functions of the program analyzing unit 111, the surface speed calculating unit 112, the cutting speed setting unit 113, the comparison unit 114, and the operation control unit 115 can be realized by the control unit 11, as shown in FIG. 4. In the RAM, various data such as temporal calculation data and/or display data is stored. The CMOS memory is backed up by a battery (not shown), and is configured as a non-volatile memory in which stored contents are maintained even when the numerical control device 100 is powered off.

The program analyzing unit 111 reads a machining program at each block, and analyzes the machining route of the workpiece.

The surface speed calculating unit 112 calculates a surface speed based on a rotation speed of the spindle designated in the machining program and a distance from a rotation center of the workpiece.

The cutting speed setting unit 113 sets a minimum cutting speed, which is a minimum value of the recommended cutting speeds, and a maximum cutting speed, which is a maximum value of the recommended cutting speeds.

The comparison unit 114 compares the surface speed calculated by the surface speed calculating unit 112 with the minimum cutting speed and maximum cutting speed set by the cutting speed setting unit 113, and outputs the comparison result to the operation control unit 115.

The operation control unit 115 controls whether to activate the constant surface speed control function based on the comparison result obtained from the comparison unit 114.

More specifically, in a case where the surface speed is equal to or higher than the minimum cutting speed and not higher than the maximum cutting speed, the operation control unit 115 does not activate the constant surface speed control function. In a case where the surface speed is less than the minimum cutting speed, the operation control unit 115 activates the constant surface speed control function so as to maintain the minimum cutting speed. In a case where the surface speed is higher than the maximum cutting speed, the control unit 115 activates the constant surface speed control function so as to maintain the maximum cutting speed.

The storage unit 12 stores the machining program that is to be analyzed by the program analyzing unit 111. In addition, the storage unit 12 stores the range of the recommended cutting speeds, that is, the minimum cutting speed, which is the minimum value of the recommended cutting speeds, the maximum cutting speed, which is the maximum value of the recommended cutting speeds, and a command value of the spindle rotation speed. Furthermore, the storage unit 12 stores the comparison result given by the comparison unit 114, i.e., a range in which an ON/OFF state of the constant surface speed control function is switched from one to another.

1.3 Operation of Invention

Figure 5:
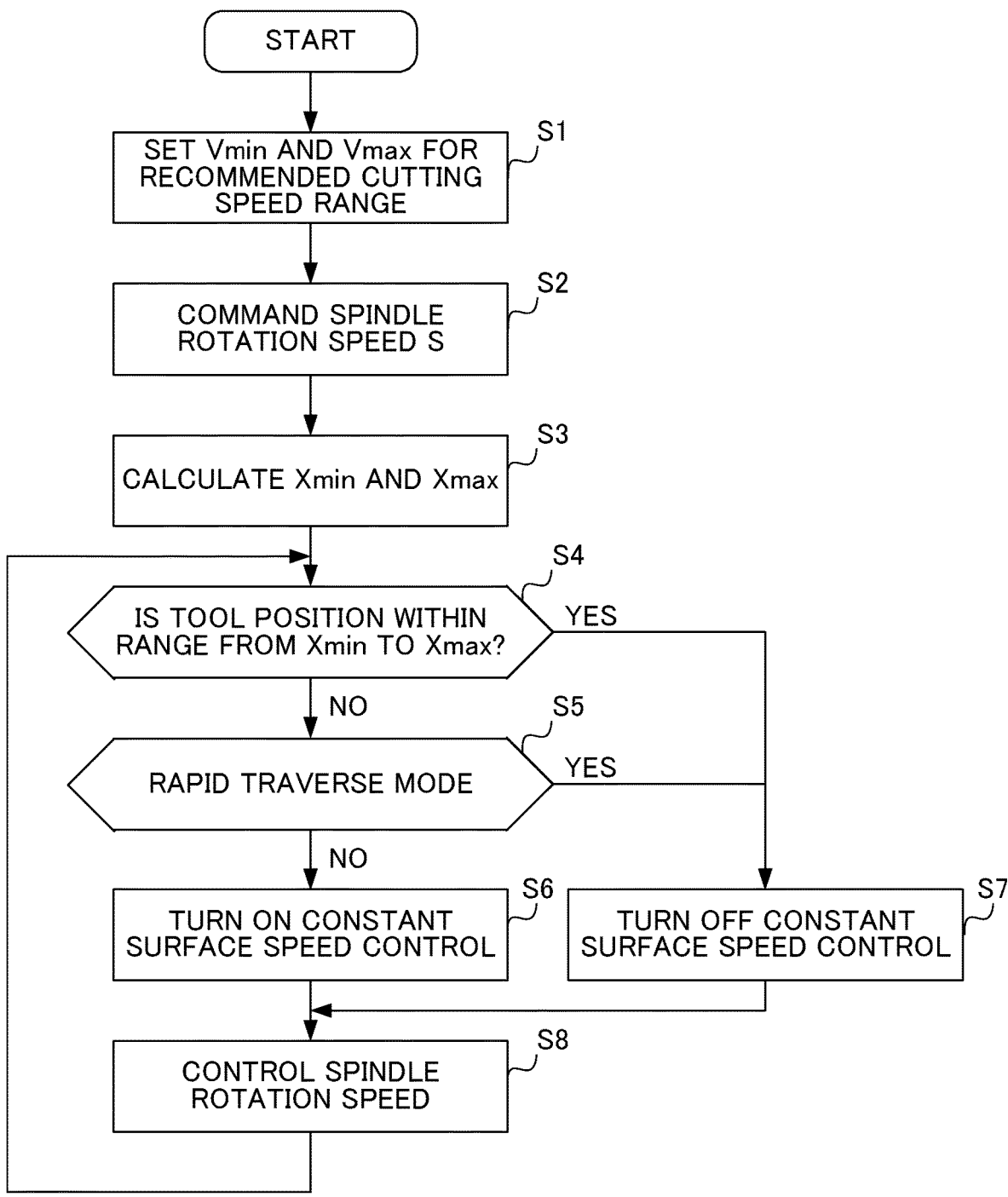
FIG. 5 is a flowchart of operation of the numerical control device according to the embodiment.

FIG. 5 is a flowchart showing operation of the numerical control device 10 according to the present embodiment.

In Step S1, the cutting speed setting unit 113 sets a range of recommended cutting speeds. More specifically, the cutting speed setting unit 113 sets a minimum cutting speed Vmin (m/min) and a maximum cutting speed Vmax (m/min).

In Step S2, the program analyzing unit 111 analyzes the machining program, so that the control unit 11 commands a spindle rotation speed S.

In Step S3, the control unit 11 calculates a tool position Xmin (mm), at which the cutting speed reaches the minimum cutting speed Vmin (m/min), and a tool position Xmax (mm), at which the cutting speed reaches the maximum cutting speed Vmax (m/min). Here, assume that the spindle rotation speed command value is S (min$^{-1}$). Then, Xmin (mm) and Xmax (mm) are respectively calculated according to the following formulae (1) and (2):

$$X\min(mm)=1000V\min/2\pi S \quad (1)$$

$$X\max(mm)=1000V\max/2\pi S \quad (2)$$

In Step S4, if the tool position is within a range from Xmin (mm) to Xmax (mm) inclusive (YES in S4), the process advances to Step S7. If the tool position is less than Xmin (mm) or higher than Xmax (mm) (NO in S4), the process advances to Step S5.

In Step S5, if the X position moves in a rapid traverse mode (YES in S5), the process advances to Step S7. In cases other than this (NO in S5), the process advances to Step S6.

In Step S6, the operation control unit 115 turns ON the constant surface speed control. More specifically, in a case where the X position is less than Xmin (mm), the operation control unit 115 activates the constant surface speed control function so as to maintain the minimum cutting speed. In a case where the X position is greater than Xmax (mm), the operation control unit 115 activates the constant surface speed control function so as to maintain the maximum cutting speed.

In Step S7, the operation control unit 115 turns OFF the constant surface speed control.

In Step S8, the operation control unit 115 controls the spindle rotation speed based on whether the constant surface speed control has been turned ON or OFF in Step S6 or S7. Then, the process returns to Step S4.

FIG. 6 shows an example of the machining program that is to be analyzed by the numerical control device 10 according to the present embodiment. Unlike in conventional machining programs, a command that specifies an ON/OFF state of the constant surface speed control does not necessarily have to be described in the machining program. In addition, in the case where the default spindle rotation speed is preliminarily set as the parameter, the spindle rotation speed command does not necessarily have to be described in the machining program, either.

1.4 Effects of First Embodiment

The numerical control device 10 according to the present embodiment is a numerical control device 10 that has a constant surface speed control function for controlling a spindle rotation rate to make a surface speed constant and that includes: a surface speed calculating unit 112 configured to calculate a surface speed based on a spindle rotation speed having been designated and a distance from a rotation center; a cutting speed setting unit 113 configured to set a minimum cutting speed and a maximum cutting speed; a comparison unit 114 configured to compare the surface speed with the minimum cutting speed and the maximum cutting speed; and an operation control unit 115 configured to control whether to activate the constant surface speed control function based on a result of the comparison made by the comparison unit 114.

With this, it is possible to turn ON/OFF the constant surface speed control during machining. In addition, since this configuration reduces the acceleration/deceleration of the spindle, the electric power consumption is reduced.

Furthermore, in the numerical control device 10 according to the present embodiment, in a case where the surface speed is equal to or higher than the minimum cutting speed and not higher than the maximum cutting speed, the operation control unit 115 does not activate the constant surface speed control function. In a case where the surface speed is less than the minimum cutting speed, the operation control unit 115 activates the constant surface speed control function so as to maintain the minimum cutting speed. In a case where the surface speed is higher than the maximum cutting speed, the control unit 115 activates the constant surface speed control function so as to maintain the maximum cutting speed.

With this, the program is generated so that the spindle rotation speed can be automatically controlled to fall within the range of the recommended cutting speeds of the tool even without a spindle rotation speed command and a constant surface speed control ON/OFF command. In addition, even if an inappropriate spindle rotation speed command is given due to, e.g., a program error, it is possible to perform machining at a spindle rotation speed that is in accordance with the recommended cutting speed.

2. Second Embodiment

Figure 7:
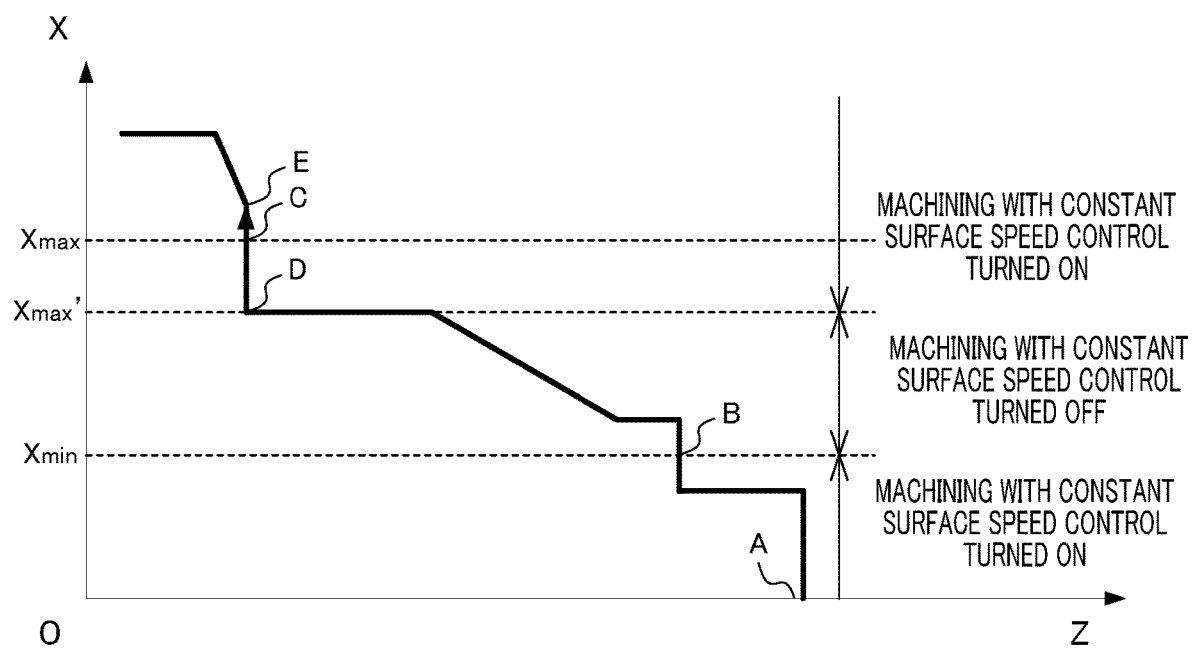
FIG. 7 is a view showing an example of a correspondence relation between a machining route and an ON/OFF state of constant surface speed control in an embodiment.
Figure 8:
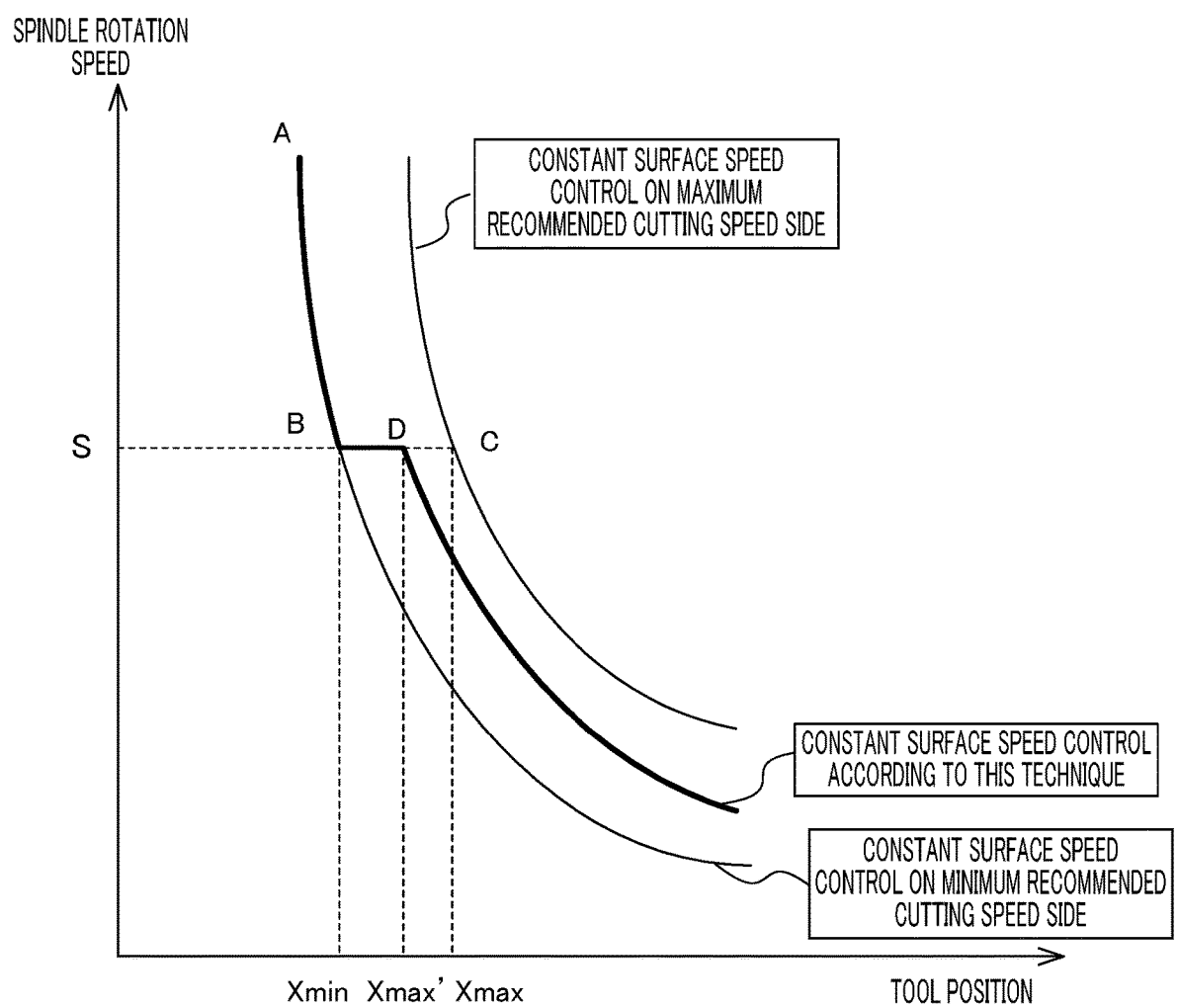
FIG. 8 shows a graph indicating how a spindle rotation speed changes when the constant surface speed control shown in FIG. 7 is executed.
Figure 9:
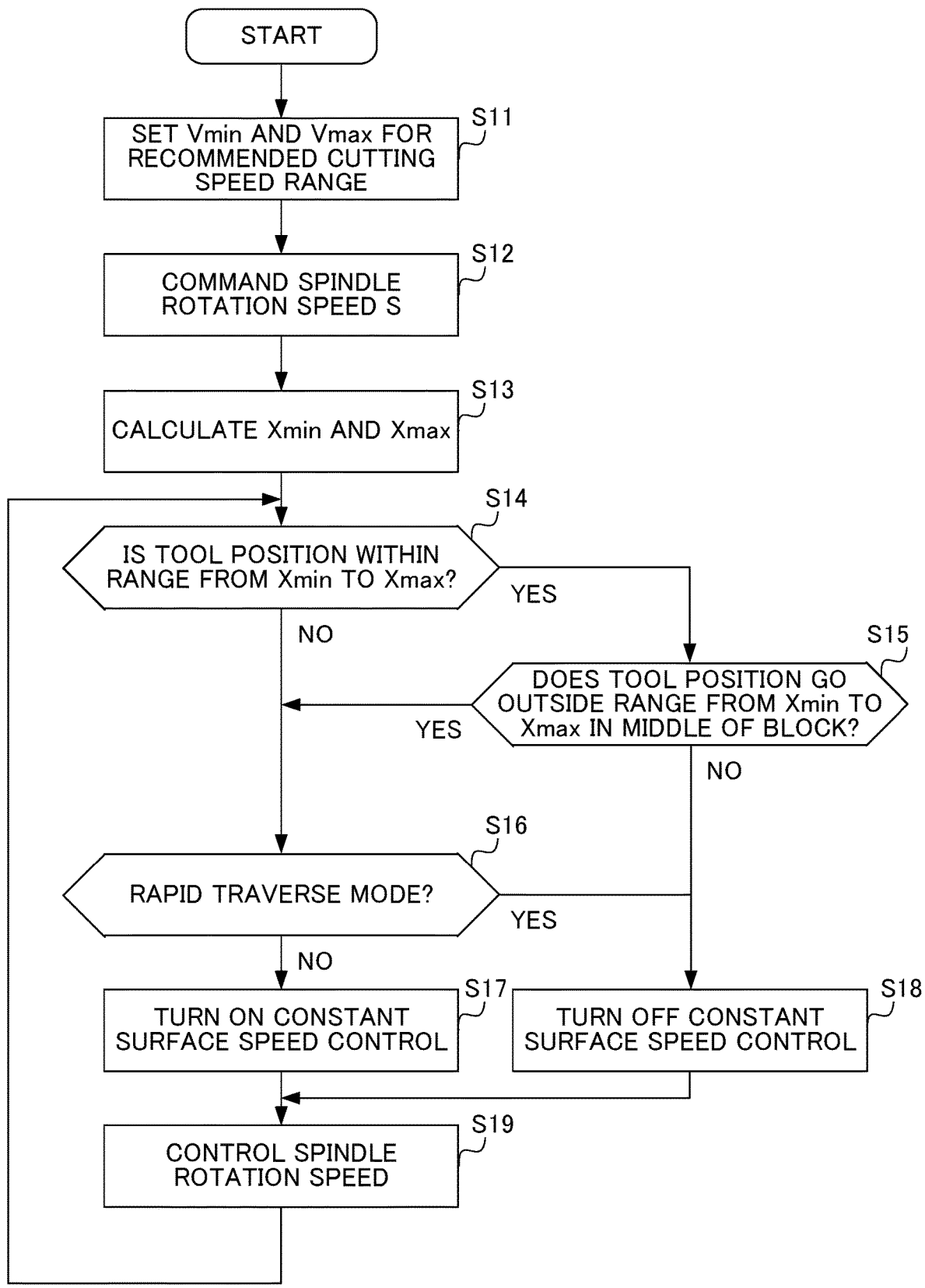
FIG. 9 is a flowchart of operation of a numerical control device according to the embodiment.

The following will describe a second embodiment of the present invention with reference to FIGS. 7 to 9.

2.1 Overview of Invention

Similarly to the numerical control device according to the first embodiment, a numerical control device according to the second embodiment automatically turns ON/OFF constant surface speed control so that a cutting speed (surface speed) falls within a range of recommended cutting speeds of a tool. In addition to this, in a case where the cutting speed goes outside the range of the recommended cutting speeds in the middle of a block (a movement command in a single line in a machining program), the numerical control device according to the second embodiment turns ON the constant surface speed control at a start point of the block, thereby preventing a change in processing lines generated by machining.

FIG. 7 shows an example of a correspondence relation between a machining route and an ON/OFF state of the constant surface speed control. As shown in FIG. 7, point D (an X position at point D is indicated as Xmax') indicates a start point of a single block (a movement command in a single line in the machining program) among machining blocks, and point E indicates a termination point of the single block. In the example shown in FIG. 7, at point C residing in a route from point D to point E, the X position exceeds Xmax, at which the cutting speed reaches the maximum cutting speed. This may possibly lead to processing lines being generated by the machining change in the middle of the block.

Therefore, in the second embodiment, the constant surface speed control is activated at point D, which is the start point of the block. That is, from point A, at which the machining route starts, to point B, at which the X position becomes Xmin, the constant surface speed control on the minimum recommended cutting speed side is set to ON. From point B to point D, at which the X position becomes Xmax', the constant surface speed control is set to OFF. In a portion of the route which extends beyond point D and which has an X position greater than Xmax', the constant surface speed control on the maximum recommended cutting speed side is set to ON.

In the example shown in FIG. 7, the movement command in the X direction is applied from point D to point E. Alternatively, a movement command in a diagonal direction may be applied from point D to point E.

FIG. 8 shows how the spindle rotation speed changes when the constant surface speed control shown in FIG. 7 is executed. From point A to point B, the spindle rotation speed changes as indicated by a portion of a curved line indicating a relation between a tool position and a spindle rotation speed, the portion corresponding to the constant surface speed control on the minimum recommended cutting speed side. Thereafter, at the time when the tool position reaches point B, that is, at the time when the X position becomes Xmin, the spindle rotation speed maintains S, which denotes a spindle rotation speed command value. Thereafter, at the time when the tool position reaches point D, that is, at the time when the X position becomes Xmax', the spindle rotation speed changes as indicated by a curved line extending through point D and indicating a relation between the tool position and the spindle rotation speed. Consequently, it is possible to prevent processing lines generated by the machining from changing in the middle of the block.

2.2 Configuration of Invention

A numerical control system 1A according to the second embodiment includes a numerical control device 10A in place of the numerical control device 10. The numerical control device 10A according to the second embodiment includes an operation control unit 115A in place of the operation control unit 115. In this point, the numerical control device 10A differs from the numerical control device 10. Other than this, a configuration of the numerical control device 10A is identical to that of the numerical control device 10. Therefore, a functional block diagram of the numerical control device 10A is not shown.

Similarly to the operation control unit 115, the operation control unit 115A controls whether to activate a constant surface speed control function based on the comparison result obtained from the comparison unit 114. In addition, in a case where a surface speed is within a range from a minimum cutting speed to a maximum cutting speed inclusive at a start point of a block included in a machining program that is being analyzed by the program analyzing unit 111 and the surface speed is outside the range at a termination point of the block, the operation control unit 115A activates the constant surface speed control function at the start point of the block.

2.3 Operation of Invention

FIG. 9 is a flowchart showing operation of the numerical control device 10A according to the second embodiment.

In Step S11, the cutting speed setting unit 113 sets a range of recommended cutting speeds. More specifically, the cutting speed setting unit 113 sets a minimum cutting speed Vmin and a maximum cutting speed Vmax.

In Step S12, the program analyzing unit 111 analyzes a machining program, so that the control unit 11 commands a spindle rotation speed S.

In Step S13, the control unit 11 calculates a tool position Xmin, at which the cutting speed reaches the minimum cutting speed Vmin, and a tool position Xmax, at which the cutting speed reaches the maximum cutting speed Vmax.

In Step S14, if the tool position is within a range from Xmin to Xmax inclusive (YES in S14), the process advances to Step S15. If the tool position is less than Xmin or higher than Xmax (NO in S14), the process advances to Step S16.

In Step S15, if the tool position goes outside the range from Xmin to Xmax inclusive in the middle of a certain block (YES in S15), the process advances to Step S16. In cases other than this (NO in S15), the process advances to Step S18.

In Step S16, if the X position moves in a rapid traverse mode (YES in S16), the process advances to Step S18. In cases other than this (NO in S16), the process advances to Step S17.

In Step S17, the operation control unit 115A turns ON the constant surface speed control. More specifically, in a case where the X position is less than Xmin, the operation control unit 115A activates the constant surface speed control function so as to maintain the minimum cutting speed. In a case where the X position is greater than Xmax', the operation control unit 115A activates the constant surface speed control function so as to maintain the cutting speed obtained when the X position is at Xmax'.

In Step S18, the operation control unit 115A turns OFF the constant surface speed control.

In Step S19, the operation control unit 115A controls the spindle rotation speed based on whether the constant surface speed control has been turned ON or OFF in Step S17 or S18.

Then, the process returns to Step S14.

2.4 Effects of Second Embodiment

In the numerical control device 10A according to the present embodiment, in a case where a surface speed is within a range from a minimum cutting speed to a maximum cutting speed inclusive at a start point of a block included in a machining program that is being analyzed and the surface speed is outside the range at a termination point of the block, the operation control unit 115A activates the constant surface speed control function at the start point of the block.

With this, it is possible to prevent processing lines generated by the machining from changing in the middle of the block.

The foregoing description has dealt with the case where the X-axis is used as the reference axis as one example. However, this is not limitative. Alternatively, any axis may be used as the reference axis.

The constituent elements included in the numerical control devices 10 and 10A and the numerical control systems 1 and 1A can be realized by hardware, software, or a combination thereof. Also, a numerical control method performed by cooperation between the constituent elements included in the numerical control devices 10 and 10A and the numerical control systems 1 and 1A can be realized by hardware, software, or a combination thereof. When the matter(s) described above is realized by software, this means that the matter(s) is achieved by a computer loading and executing a program.

The programs can be stored by way of various types of non-transitory computer readable media, and can be supplied to the computer. Examples of the non-transitory computer readable media encompass various types of tangible storage media. Examples of the non-transitory computer readable media encompass magnetic recording media (e.g., a flexible disk, magnetic tape, a hard disk drive), magneto-optic recording media (e.g., a magneto-optic disk), CD-ROM (Read Only Memory), CD-R, CD-R/W, and semiconductor memories (e.g., mask ROM, PROM (programmable ROM), EPROM (Erasable PROM), flash ROM, and RAM (Random Access Memory)). The programs may alternatively be supplied to the computer via various types of transitory computer readable media. Examples of the transitory computer readable media encompass an electric signal, an optical signal, and electromagnetic waves. The transitory computer readable media can supply the programs to the computer over a wired communication channel such as an electric wire or an optical fiber or a wireless communication channel.

EXPLANATION OF REFERENCE NUMERALS 1, 1A numerical control system
10, 10A numerical control device
11 control unit
12 storage unit
111 program analyzing unit
112 surface speed calculating unit
113 cutting speed setting unit
114 comparison unit
115, 115A operation control unit
20 machine tool

What is claimed is:

1. A numerical control device having a constant surface speed control function for controlling a spindle rotation rate to make a surface speed constant, the constant surface speed control function being adapted to avoid, in a case of cutting a machining target attached to a spindle of a lathe while the spindle continues to rotate at a constant spindle rotation rate, a situation in which the surface speed that is a relative speed between a tool and a contact portion of the machining target decreases as the tool advances toward a center portion of the machining target and a situation in which the surface speed that is the relative speed between the tool and the contact portion of the machining target increases as the tool advances toward an outer periphery of the machining target, the numerical control device comprising:

a cutting speed setting unit configured to set a minimum cutting speed and a maximum cutting speed with which a range of recommended cutting speeds as relative speeds between the tool and the contact portion of the machining target is designated in advance;

a surface speed calculating unit configured to calculate the surface speed that is the relative speed between the tool and the contact portion of the machining target, based on a spindle rotation speed having been designated for the spindle to which the machining target is attached and based on a distance from a rotation center of the machining target;

a comparison unit configured to compare, during the cutting, the surface speed, which has been calculated by the surface speed calculating unit, with the minimum cutting speed and the maximum cutting speed, which have been set by the cutting speed setting unit and with which the range of the recommended cutting speeds is designated; and an operation control unit configured to control whether to activate the constant surface speed control function based on a result of the comparison made by the comparison unit such that the operation control unit deactivates the constant surface speed control function in a case where the surface speed is within the range of the recommended cutting speeds whereas the operation control unit activates the constant surface speed control function in a case where the surface speed is out of the range of the recommended cutting speeds.

2. The numerical control device according to claim 1, wherein the operation control unit is further configured to activate the constant surface speed control function so as to maintain the minimum cutting speed in a case where the surface speed is less than the minimum cutting speed, and the operation control unit is further configured to activate the constant surface speed control function so as to maintain the maximum cutting speed in a case where the surface speed is higher than the maximum cutting speed.

3. The numerical control device according to claim 1, further comprising a program analyzing unit configured to analyze a machining program, wherein
the operation control unit is further configured to activate the constant surface speed control function at a start point of a block included in the machining program that is being analyzed, in a case where the surface speed is within a range from the minimum cutting speed to the maximum cutting speed inclusive at the start point of the block and the surface speed is outside the range at a termination point of the block.

* * * * *